(12) United States Patent
Lumsden

(10) Patent No.: US 7,694,454 B1
(45) Date of Patent: Apr. 13, 2010

(54) IN-LINE SLIDING FISHING LINE RELEASE

(76) Inventor: Steven Grant Lumsden, P.O. Box 1620, Boring, OR (US) 97009

( * ) Notice: Subject to any disclaimer, the term of this patent is extended or adjusted under 35 U.S.C. 154(b) by 222 days.

(21) Appl. No.: 11/778,031

(22) Filed: Jul. 14, 2007

(51) Int. Cl.
*A01K 91/00* (2006.01)

(52) U.S. Cl. .................... 43/43.12; 43/27.4
(58) Field of Classification Search ............ 43/43.12, 43/27.4; D22/134
See application file for complete search history.

(56) References Cited

U.S. PATENT DOCUMENTS

| | | | | |
|---|---|---|---|---|
| 3,641,700 A | * | 2/1972 | Harrison | 43/43.12 |
| 3,816,954 A | * | 6/1974 | Bissonette | 43/43.12 |
| 3,905,148 A | * | 9/1975 | Naone et al. | 43/43.12 |
| 3,919,801 A | * | 11/1975 | Bart | 43/17 |
| 3,930,330 A | * | 1/1976 | Black | 43/17 |
| 3,974,589 A | * | 8/1976 | Henze et al. | 43/43.12 |
| 3,977,118 A | | 8/1976 | Seymour | |
| 4,012,863 A | * | 3/1977 | Lori | 43/43.12 |
| 4,069,611 A | * | 1/1978 | Dusich et al. | 43/43.12 |
| 4,161,838 A | | 7/1979 | Gapen | |
| 4,173,091 A | * | 11/1979 | Emory, Jr. | 43/43.12 |
| 4,177,599 A | * | 12/1979 | Pettersen | 43/43.12 |
| 4,204,356 A | * | 5/1980 | Smith | 43/26.1 |
| 4,212,127 A | * | 7/1980 | Daniels | 43/43.12 |
| 4,221,068 A | * | 9/1980 | Roemer, Jr. | 43/43.12 |
| 4,255,890 A | * | 3/1981 | Smith | 43/43.12 |
| 4,334,380 A | | 6/1982 | Daniels | |
| 4,417,414 A | * | 11/1983 | Hood et al. | 43/43.12 |
| 4,428,142 A | * | 1/1984 | Shedd et al. | 43/43.12 |
| 4,430,823 A | * | 2/1984 | Henze et al. | 43/43.12 |
| 4,656,776 A | * | 4/1987 | Macachor | 43/43.12 |
| 4,679,347 A | | 7/1987 | Stirtz | |
| 4,700,505 A | * | 10/1987 | Weber | 43/43.12 |
| 4,823,723 A | | 4/1989 | Brooks | |
| 4,890,410 A | | 1/1990 | Pratscher | |
| 4,932,154 A | | 6/1990 | Andreetti | |
| 5,107,616 A | * | 4/1992 | Ryder | 43/43.12 |
| 5,177,895 A | | 1/1993 | Baron | |

(Continued)

*Primary Examiner*—Kimberly S Smith
*Assistant Examiner*—Joshua J Michener
(74) *Attorney, Agent, or Firm*—Applied Logic Patents; Andrew B. Levy

(57) ABSTRACT

An in-line sliding line release is disclosed for holding a sinker weight to a fishing line. The release apparatus is attachable to and moveable along a fishing line with the capability of being manually fixed to the line so as to provide any desirable spacing between the lure or bait and the sinker weight. The release apparatus includes a compression arm which locks into place under a variable release tension setting. When a pull or strike from the lure line overcomes the adjustable tension set on the release housing body, the compression arm rotates upward by ninety degrees releasing the hold on the line sliding down to the lure or preset in-line stop. In the circumstance that there is no pull from the lure line, the tension screw means may be overcome by pulling the cam line guide manually to release the compression arm which will allow the device to slide down the line as desired. It has been observed and experienced that the length of leader distance between the lure or bait and the weight influences presentation and fishing success. Though long leaders often increase catch rates for various reasons, the ability to land a fish is severely compromised when using in-line weight systems. This device embodiment offers a solution for a variety of needs including an adaptation for ease of use with downrigger systems.

11 Claims, 8 Drawing Sheets

U.S. PATENT DOCUMENTS

| | | |
|---|---|---|
| 5,505,016 A | 4/1996 | Baron |
| 5,778,593 A | 7/1998 | Baron |
| 5,893,232 A | 4/1999 | Horton |
| 6,289,627 B1 | 9/2001 | Gibbs |
| 6,675,526 B1 | 1/2004 | Baron |
| 6,763,630 B1 | 7/2004 | Jenkins |
| 6,813,856 B1 | 11/2004 | Sitkewicz |
| 6,862,838 B1 | 3/2005 | Gibbs |

\* cited by examiner

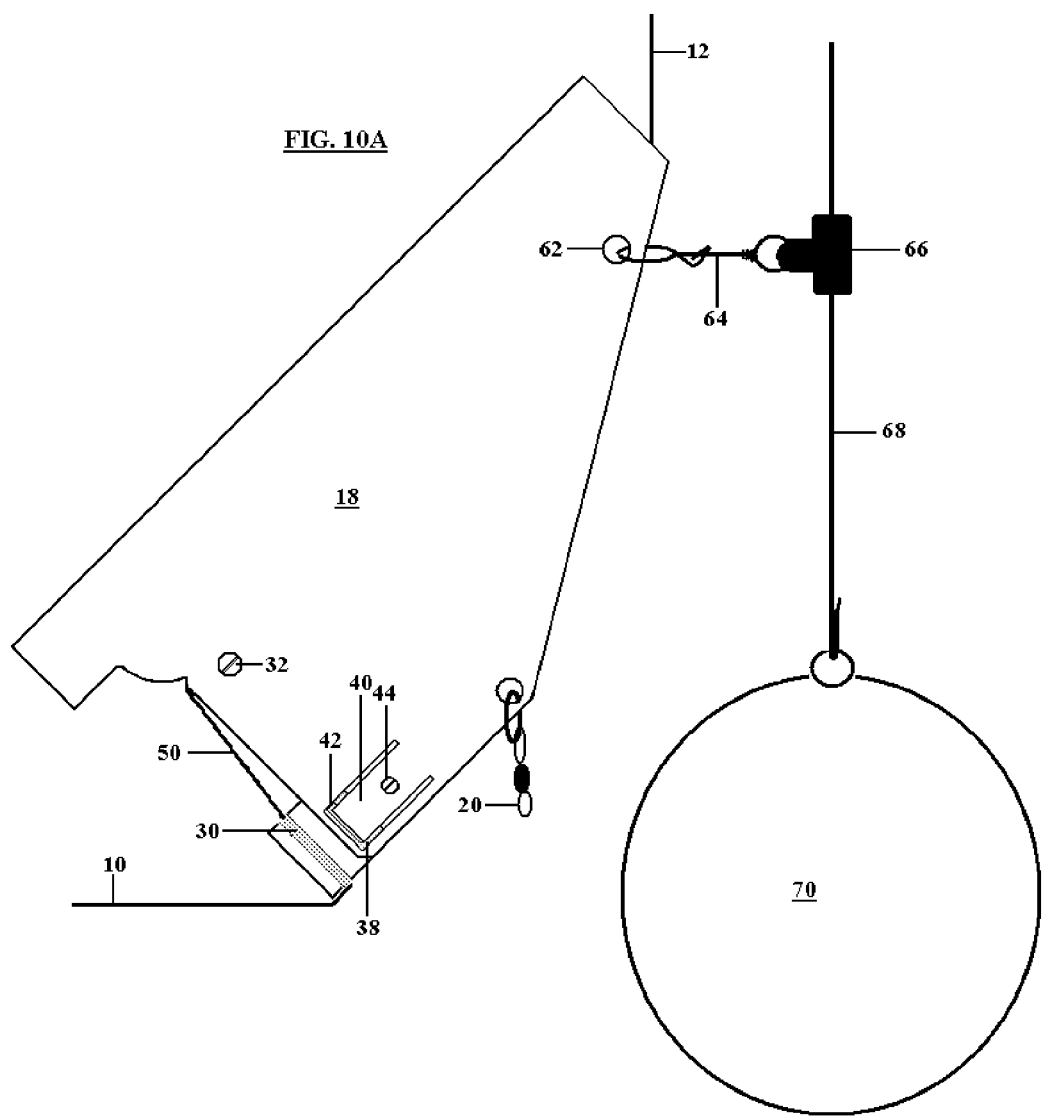

IN-LINE SLIDING FISHING LINE RELEASE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to in-line fishing devices of the type used in maintaining a depth of a lure or bait attached to a fishing line during a trolling or stationary position in running water currents.

2. Prior Art

One embodiment of the invention relates to a unique in-line release without the necessity of any external apparatus such as a downrigger, outrigger, or planer. This advantage allows for an effective, economical, and convenient solution when long leaders, body of water bottom proximity, or presentations to stratified fish are desired without the need to use or invest in cumbersome and expensive gear. While other systems have been developed for maintaining the depth of the lure or bait attached to a fishing line during trolling or anchoring operations, they have some salient disadvantages which have been overcome.

The downrigger weight may be lowered to the desired depth thereby carrying the fishing line downward while the lure or bait trails the downrigger line in a horizontal fashion. These types of systems require additional and potentially heavy gear and may be timely to install. A downrigger line may become entangled with the main fishing line or interfere with the playing of the fish, resulting in an unsatisfying experience for the fisher. Similar to downrigger fishing, outriggers can be cumbersome to use often requiring a fishing partner to secure them to avoid interferences as the fisher plays and lands the fish.

A downrigger device may require much time to setup, is expensive, and may have undesirable electrical charges that repel fish. Furthermore, a downrigger line may become entangled with the main fishing line resulting in extra effort to disentangle the lines as well as become cumbersome and interfere with landing a fish. One of the advantages of this embodiment is the adaptability in the use of rod/reel types, lure/bait options under variable conditions related to saltwater, freshwater, fast-moving or slow current, trolling speed, drifting, or fishing on or proximity to the body of water bottom. This device also gives the fisher the capability to target suspended fish, with ease of use, more dependable tracking, and reduced chances of line entanglement. This embodiment further allows a fisherman to use any leader length without the difficulties encountered landing fish with long leaders.

OBJECTS AND ADVANTAGES

The present embodiment of the invention allows this device to become a free sliding weight after the fish is hooked and slide down the lure line to the fish or a stop placed in the line near the fish or terminal gear. This feature allows the fish to run at any point in the retrieval process without any interference from the gear.

The present embodiment of the invention allows unimpeded and variable leader and sinker line length. The present invention has an adjustable tension means available and is adaptable to changing conditions (fish type, lure/bait type, current or water speed). The terminal gear lure/bait combination may be at any distance from the sinker, compensating for wary and/or shy fish. This capability provides the fisher with nearly infinite possibilities for the presentation of lure or bait combinations while trolling, drifting or at anchor.

Advantages of this invention's embodiment of a system are manifold due to its ability to vary the lure/bait combination and weight distances while allowing a fish to be landed without the encumbrances of long leaders and weight lines. Proximity to the body of water bottom is maintained by varying a fixed weight line. The lure/bait combination may be presented to any desired stratum in the water column by knowledge of water speed, fishing line diameter and distance from the rod. The capacity to allow any desired distance between sinker and lure/bait combination provide the fisher a unique ability for a stealthy presentation to wary fish at any distance from the weight as desired without compromising the efficacy of landing a fish. These advantages of the present invention allow the lure or bait to "search" in the running water current, drifting or trolling path, and allow for unlimited distance from the sinker enabling stealthy presentations to wary and sensitive fish. Another advantage for a trolling fishing operation is the provision of maintaining a presentation position within a particular strata or depth using any desired length of leader line. A further advantage of this embodiment is that the tension adjustment mechanism is easily controlled by adjustable screws that allow for variable release settings by manual adjustments.

One exemplary function of the invention embodiment is to allow unlimited lure/bait separation distance from a weight for variations in presentation. In scenarios in which this distance is significant, the fisher is greatly encumbered in ability to bring a fish to land or net when using a fixed long leader attached to a weighted line. Although other prior art mechanisms can be effective, there may be severe compromises in the ability to land a fish unless the present embodiment is utilized. In this embodiment, the device also allows the fisher to maintain proximity to the bottom of water body by using any desired interval between the body of the device and the necessary weight. When fish are stratified in deep water, the depth of this device is controlled by weight, speed of the current or boat, and line diameter. In this embodiment, the device may be used with typical weights and planer devices.

An other exemplary use of this device is in its adaptation for use with a traditional down rigger. By adjusting the In Line Sliding Release to a lighter release tension than the down rigger release attached to the Sinker Connection (20) a fish quarry may bite and release the In Line device while not losing depth control allowing the bait or lure to maintain depth while a fish takes the line until the fish hook is set. A further benefit of an In Line Sliding Release (18) is the use of allowing the fisher to switch between down rigger and weighted fishing styles without the necessity for line re-rigging. These capabilities allow the fisher to have a unique and varied presentation in a wide range of circumstances increasing the capability to present a lure or bait to wary and sensitive fish while insuring ease of use in landing fish without losing the direct and close control of the fishing rod and reel.

SUMMARY

In accordance with the present invention embodiment, a relatively cost effective, easy to use, in-line fishing release is provided whereby a fishing line may be presented in various configurations that include variable leader length and weight distances from the lure or bait as well as depth during trolling, drifting, or stationary position in a running water current. Wherein the release is activated when a fish strikes and wherein the magnitude of the force exerted on the line by the fish releases the line resulting in the device sliding down the line to the bait, lure, or predetermined point resolving the disadvantage of a long leader in fighting and landing the fish. The force required to release the device may be adjusted to accommodate to types of fish and conditions. The in-line release in accordance with the present invention embodiment is constructed from a resilient plastic. A compression arm locks into place under a variable release tension setting adjusted by a clip arm tension screw and brake adjustment screw. When the device resides in a first position (locked), a strike or pull from the lure line overcomes the tension setting on the compression arm which rotates clockwise by ninety degrees to a second position (slide) and releases the hold on the line allowing the device body to slide down the fishing line toward the lure or stop. When there is no pull or strike from the lure line, the locked compression arm may be manually pulled outward to enable a 'quick' release of the pivot cam which allows the device to slide down the lure line as desired.

BRIEF DESCRIPTION OF THE DRAWINGS

FIG. 10a is a downstream elevation view (lure side) of the In Line Sliding Release in a Locked Position attached to a Downrigger.

DRAWINGS

Reference Numerals

10 Leader Line to Lure or Bait
12 Line to Fishing Rod and Reel
14 Fishing Rod and Reel
16 Boat
18 In-line Sliding Release
20 Sinker Connection
22 Sinker
24 Sinker Drop Line
26 Lure or Bait
28 Fish
30 Pivot Cam Line Guide
32 Compression Arm Axle Pin
34 Compression Arm Axle Pin Placement
36 Pivot Cam Pickup Groove
38 Compression Arm
40 Clip Arm
42 Cam Clip Catch
44 Clip Arm Tension Screw
46 Clip Arm Screw Placement
48 Release Housing Body
50 Body Transverse Line
52 Longitudinal Line Guide
54 Release Body Cover Plate
56 Brake
58 Brake Adjustment Screw
60 Body of Water Bottom
62 Accessory Sinker/Downrigger Attachment
64 Accessory Clip
66 Downrigger Secondary Release
68 Downrigger Cable
70 Downrigger Weight

DETAILED DESCRIPTION OF DRAWINGS

Figure 1A:
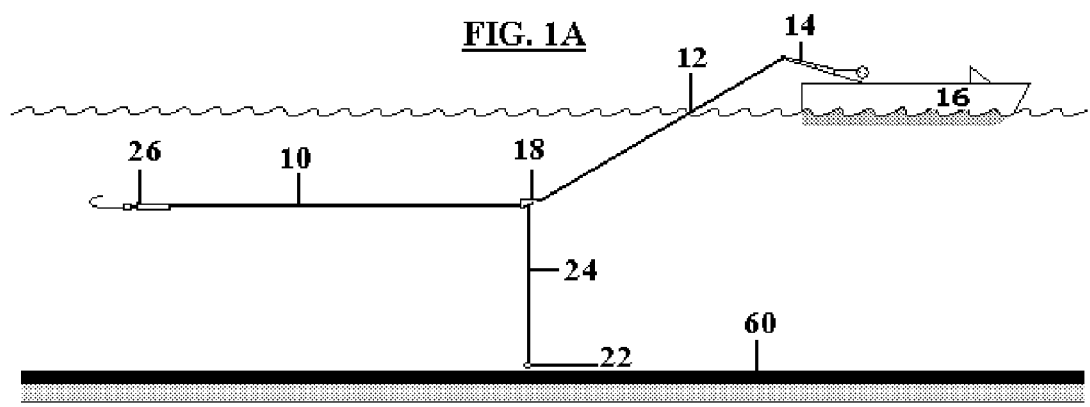
FIG. 1a is an operational view of the In Line Sliding Release in a Locked Position while trolling or anchoring with body of water bottom contact.
Figure 1B:
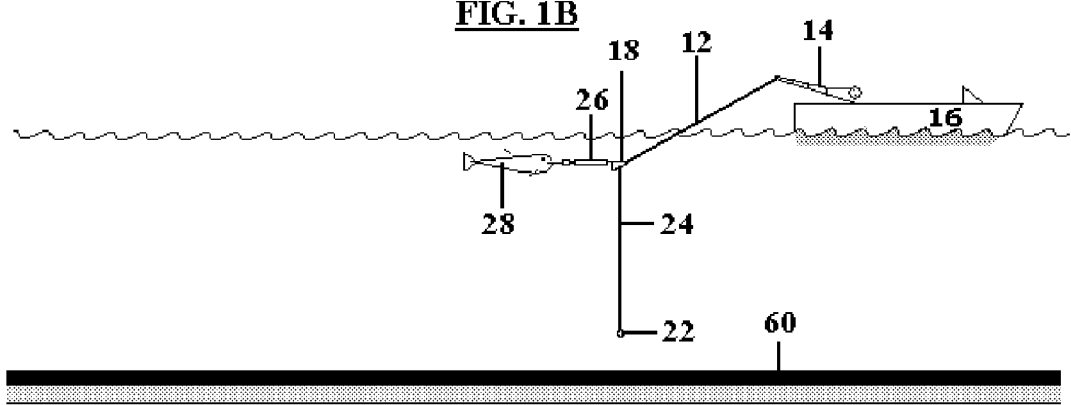
FIG. 1b is an operational view of the In Line Sliding Release in an Unlocked Position while trolling or anchoring with body of water bottom contact while retrieving a fish.
Figure 1C:
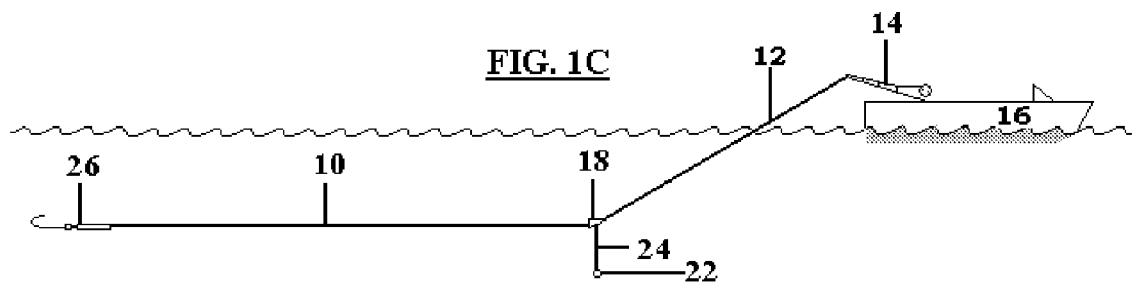
FIG. 1c is an operational view of the In Line Sliding Release in a Locked Position while trolling or anchoring without body of water bottom contact.
Figure 1D:
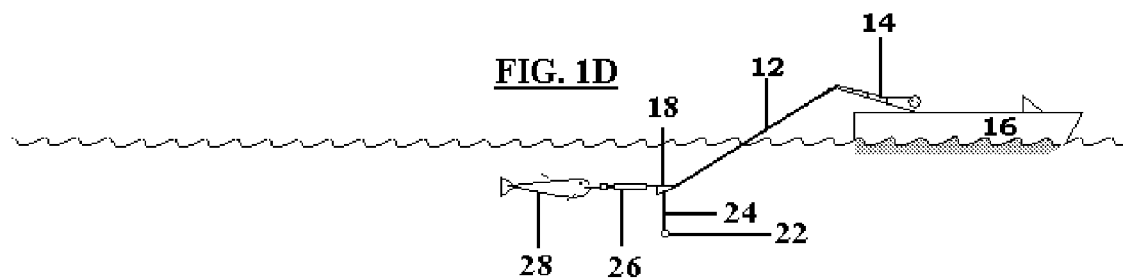
FIG. 1d is an operational view of the In Line Sliding Release device in an Unlocked Position while trolling or anchoring without body of water bottom contact while retrieving a fish.

One embodiment of the in-line sliding fishing release in accordance with the present invention is illustrated in the following figures. As observed in the operational drawings of FIGS. 1a and 1c, the in-line sliding release is used in a locked position while trolling, drifting or anchoring with or without water bottom contact. A boat 16 is shown with a fishing rod and reel 14 having a line to fishing rod 12 is attached to the in-line sliding release 18. The in-line sliding release 18 connects to the sinker drop line 24 and the line leader to lure/bait 10. The lure/bait 26 resides at the distal end of the line leader to lure/bait 10. The drawing of FIG. 1*b* shows the retrieval of a fish 28 where the pull of the fish 28 has unlocked the device. The in-line sliding release 18 has come to rest at the distal end of the line to fishing rod and reel 12 in contact with the lure/bait 26 or pre-positioned stop. A fish 28 is hooked on the lure/bait 26 in this scenario. The drawing of FIG. 1*d* shows retrieval of a fish 28 where there is no bottom water contact.

Figure 2A:
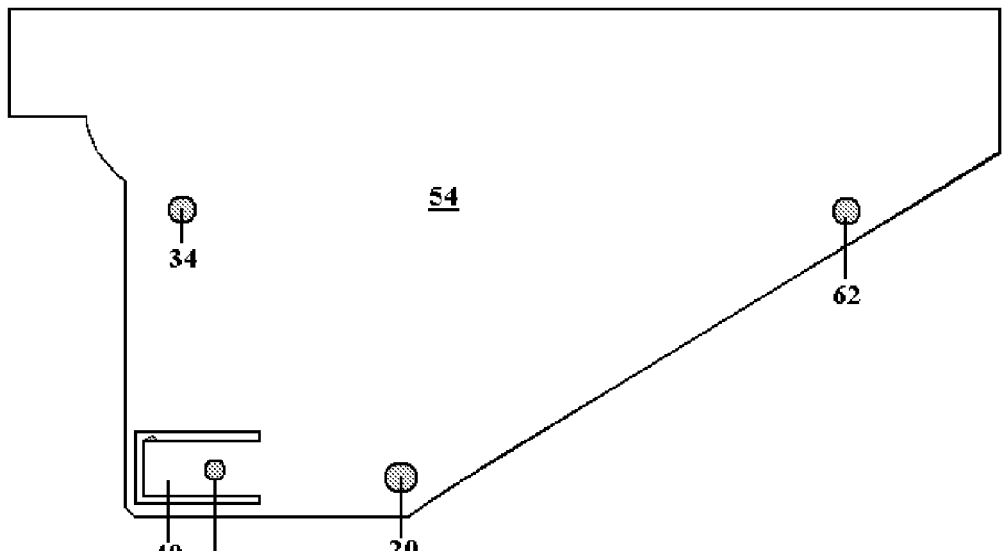
FIG. 2a is an elevation view of the Release body Cover Plate.
Figure 2B:
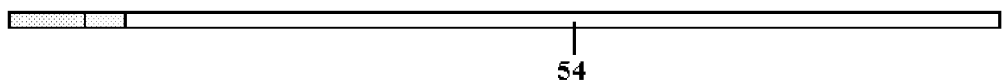
FIG. 2b is a bottom view of the Release Body cover Plate.

The drawing of FIG. 2*a* shows a release body cover plate 54 covering the in-line sliding release 18. The release body cover plate 54 includes a clip arm 40. The drawing of FIG. 2*b* shows a bottom orthogonal view of the release body cover plate 54.

Figure 3A:
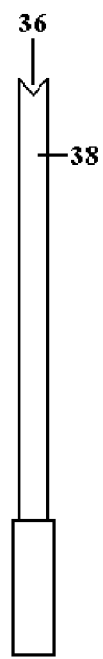
FIG. 3a is a frontal view of the Compression Arm of the device.
Figure 3B:
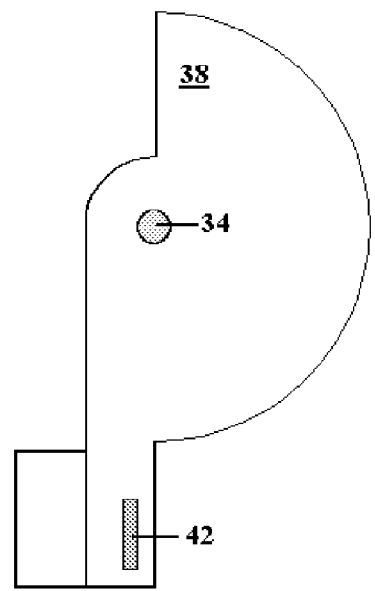
FIG. 3b is an elevation view of the Compression Arm of the device.

The drawing of FIG. 3*a* shows a frontal view of the compression arm 38 and the pivot cam pickup groove 36. The drawing of FIG. 3*b* shows a side elevation view of the compression arm axle pin placement 34, compression arm 38 and cam clip catch 42.

Figure 4A:
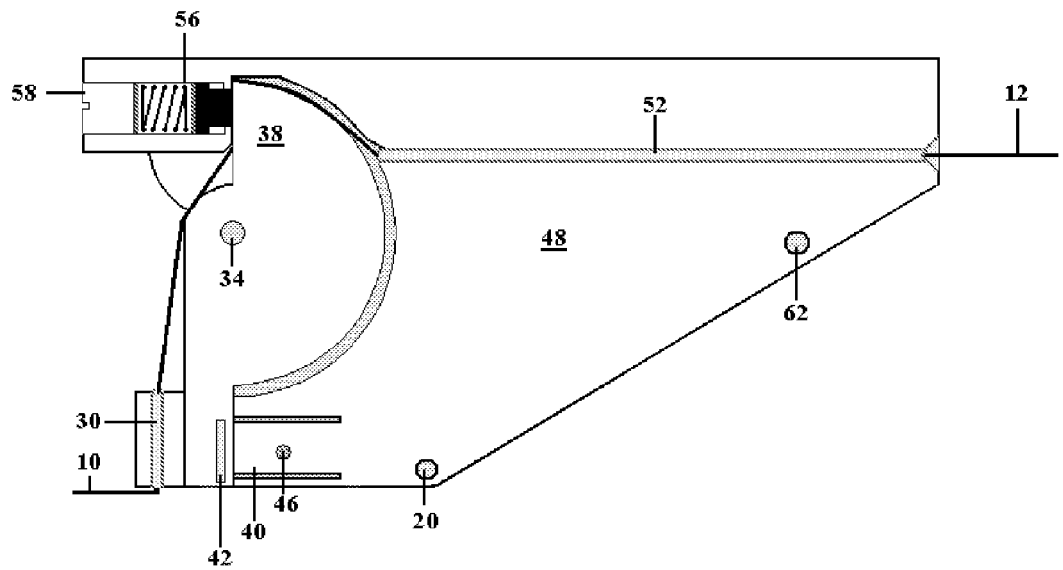
FIG. 4a is an elevation view of the Release Body Housing with the Compression Arm in the Locked Position.
Figure 4B:
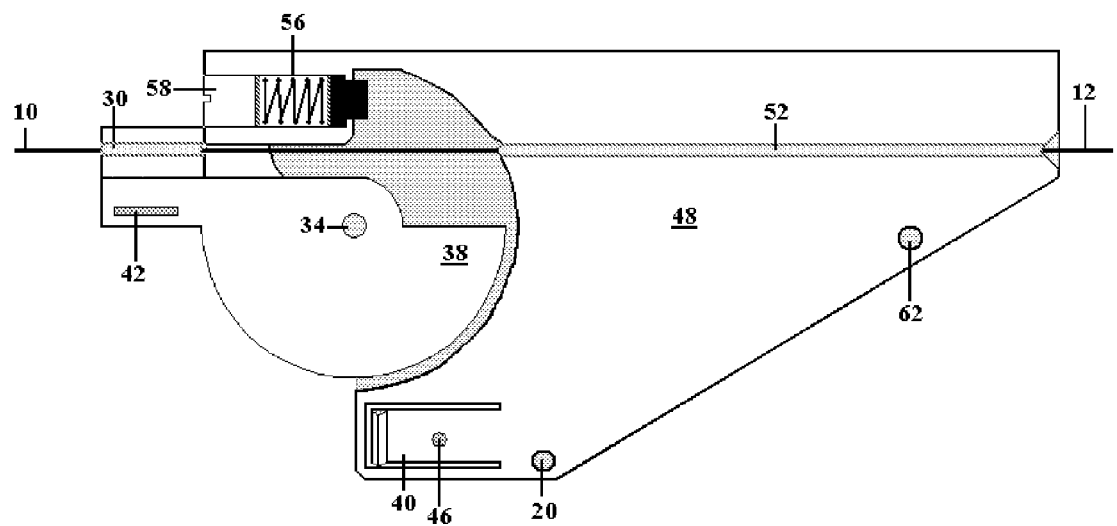
FIG. 4b is an elevation view of the Release Body Housing with the Compression Arm in an Unlocked Position.

The drawing of FIG. 4*a* shows a side elevation view of a release housing body 48 with compression arm 38 in a locked position in contact with a brake 56 where clip arm 40 engages cam clip catch 42. The release housing body 48 includes a sinker connection 20. Brake 56 tension is adjusted by brake adjustment screw 58. The longitudinal line guide 52 is formed with a plastic tube insert. The pivot cam line guide 30 is formed with a soft rubberized like composition. A located device position maintains a secured position on the line to lure/leader 10 and line to fishing rod and reel 12. There is no free movement of either the line to lure/leader 10 or line to fishing rod and reel 12 relative to each of the pivot cam line guide 30 and the longitudinal line guide 52. The drawing of FIG. 4*b* shows a side elevation view of a release housing body 48 with compression arm 38 in an unlocked position. Pivot cam line guide 30 is collinear with respect to longitudinal line guide 52. Clip arm 40 is released from cam clip catch 42 and compression arm 38 has rotated clockwise away from brake 56.

Figure 5A:
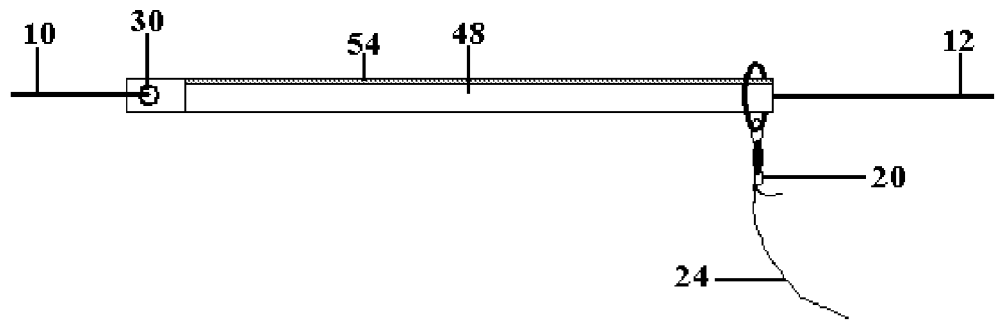
FIG. 5a is a bottom view of the In Line Sliding Release in a Locked Position.
Figure 5B:
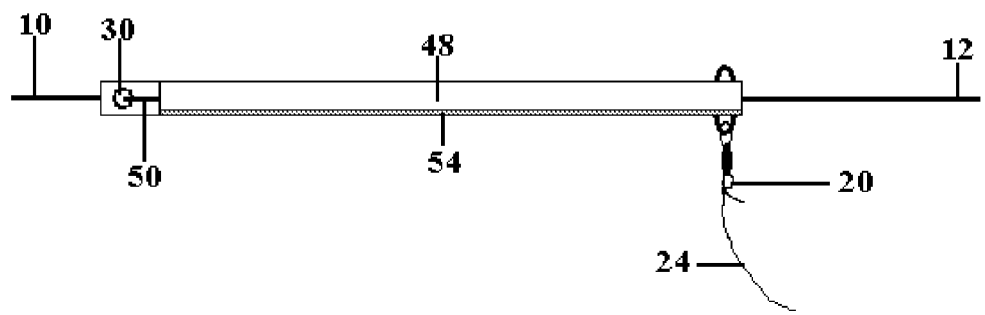
FIG. 5b is a top view of the In Line Sliding Release in a Locked Position.

The drawing of FIG. 5*a* shows a bottom orthogonal view of the in-line sliding release in an unlocked position. The line leader to lure/bait 10 enters the pivot cam guide 30. The compression arm 38 is surrounded on its upper and lower transverse edges by clip arm 40 which connects with release housing 48. The line to fishing rod and reel 12 emerges from the release housing 48 where the sinker drop line 24 is positioned. The drawing of FIG. 5*b* shows a top orthogonal view of the in-line sliding release in a locked position. The release housing body 48 is located on the side closest to the line to fishing rod 12 nearest sinker drop line 24.

Figure 6A:
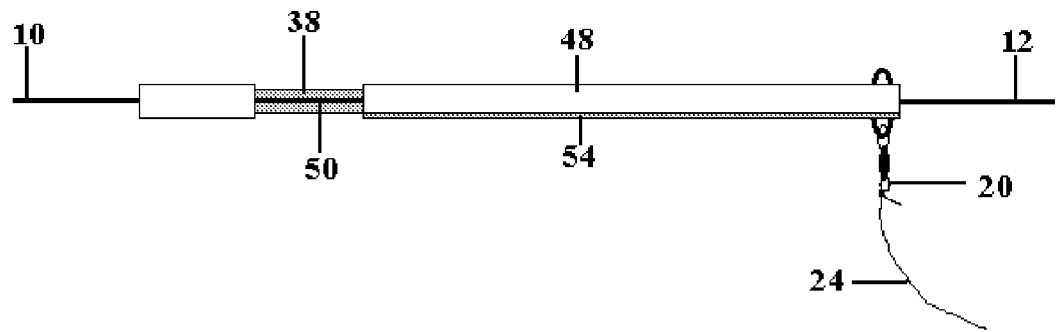
FIG. 6a is a top view of the In Line Sliding Release in an Unlocked Position.
Figure 6B:
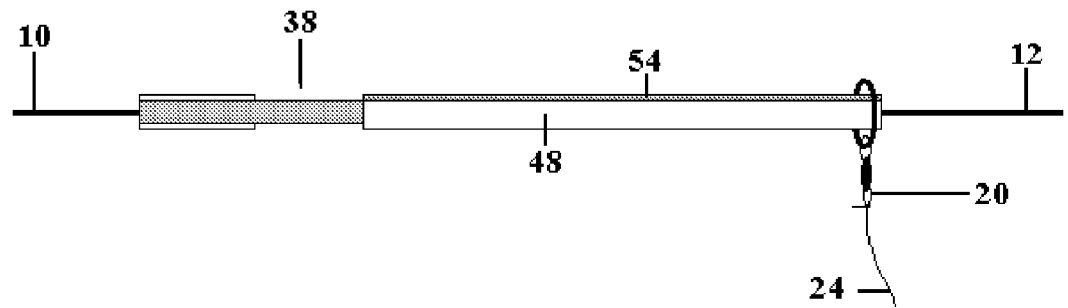
FIG. 6b is a bottom view of the In Line Sliding Release in an Unlocked Position

The drawing of FIG. 6*a* shows a top orthogonal view of the in-line sliding release in an unlocked position. In this drawing compression arm 38 has rotated toward the line leader to lure/bait 10. As in FIG. 5*b*, the body transverse line 50 passes over compression arm 38 where there is more exposure of body transverse line 50 than in FIG. 5*b*. The drawing of FIG. 6*b* shows a bottom orthogonal view of the in-line sliding release in an unlocked position.

Figure 7A:
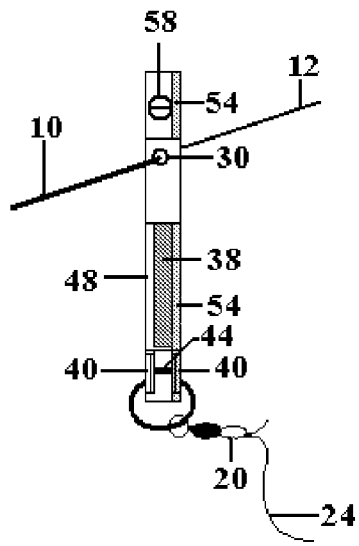
FIG. 7a is a downstream frontal view (lure side) of the In Line Sliding Release in an Unlocked Position.
Figure 7B:
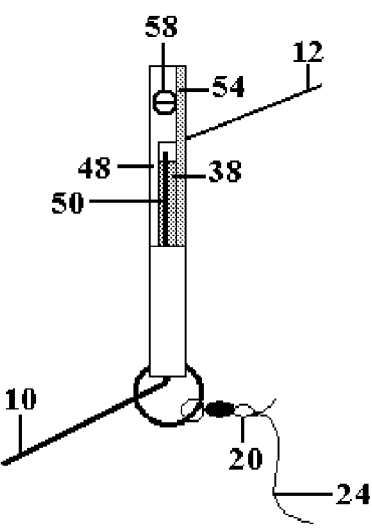
FIG. 7b is a downstream frontal view (lure side) of the In Line Sliding Release in a Locked Position.

The drawing of FIG. 7*a* shows a downstream frontal view (lure side) of the In Line Sliding Release in an unlocked position. The line leader to lure/bait 10 enters pivot cam line guide 30 and is collinear with the line to fishing rod 12. Compression arm 38 is located below pivot cam line guide 30 and over release body housing 48. Clip arm tension screw 44 is located below compression arm 38. Clip arm 40 is located on each side of clip arm tension screw 44. Brake adjustment screw 58 is located above pivot cam line guide 30. The drawing of FIG. 7*b* is a downstream frontal view (lure side) of the In Line Sliding Release in a Locked Position. The line leader to lure/bait 10 is positioned at the lower portion of this view. Body transverse line 50 is shown to eclipse compression arm 38. Brake adjustment screw 58 is located at the distal end of release housing body 48. The line to fishing rod 12 exits from the posterior side of this view.

Figure 8A:
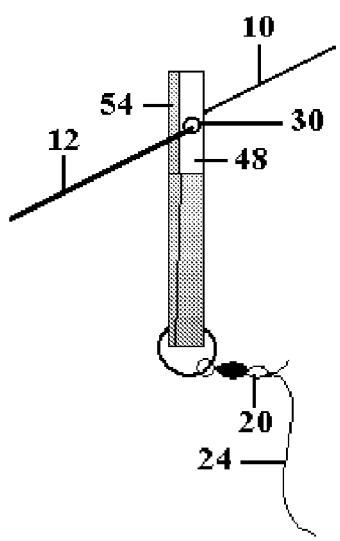
FIG. 8a is an upstream frontal view (fishing rod side) of the In Line Sliding Release in an Un-locked Position.
Figure 8B:
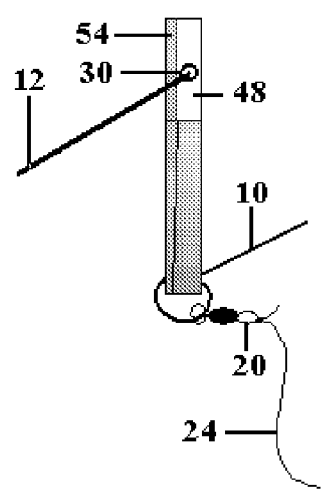
FIG. 8b is an upstream frontal view (fishing rod side) of the In Line Sliding Release in a Locked Position.

The drawing of FIG. 8*a* shows an upstream frontal view (fishing rod side) of the In Line Sliding Release in an unlocked position. The line to fishing rod 12 enters the pivot cam line guide 30. The sinker drop line 24 is shown in the lower portion of this diagram. The pivot cam line guide 30 is located within the release housing body 48. The release body cover plate 54 is located on each outer edge of the release housing body 48. The leader line to lure/bait 10 will exit from the posterior side of this view and it is approximately collinear with the line to fishing rod and reel 12. The drawing of FIG. 8*b* is an upstream frontal view (fishing rod side) of the In Line Sliding Release in a locked position. In this drawing the leader line to lure/bait 10 exits the device from the lower posterior corner nearest the sinker line drop 24. In all other ways this drawing is identical to the drawing of FIG. 8*a*.

Figure 9A:
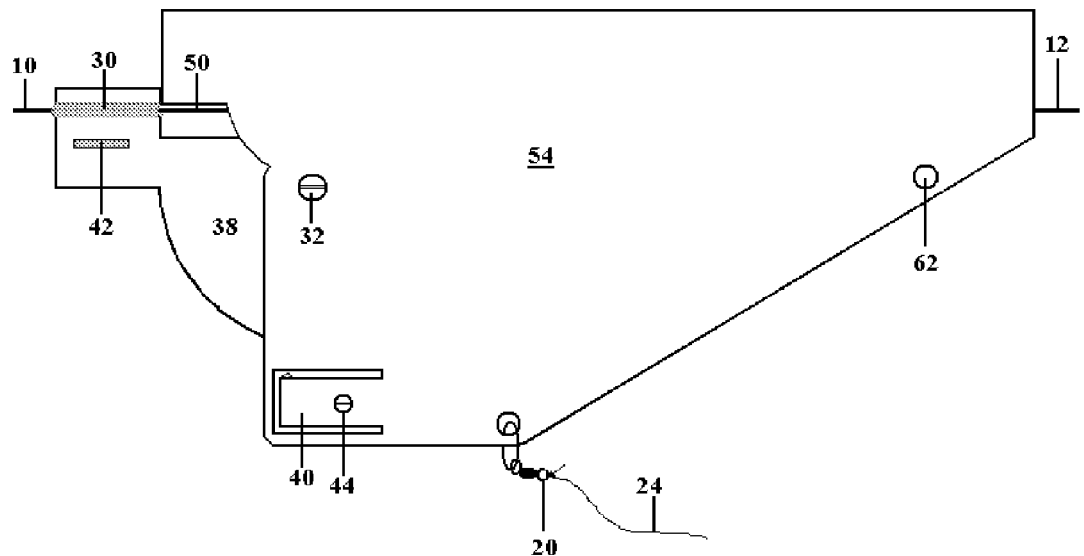
FIG. 9a is an elevation view of the In Line Sliding Release in an Unlocked Position.
Figure 9B:
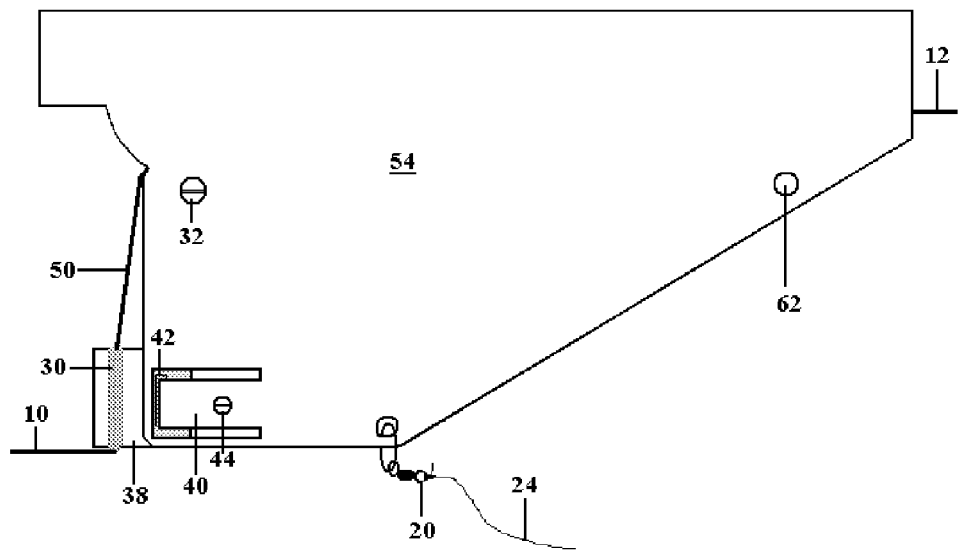
FIG. 9b is an elevation view of the In Line Sliding Release in a Locked position.

The drawing of FIG. 9*a* is an elevation view of the In Line Sliding Release in an unlocked position. The leader line to lure/bait 10 connects with pivot cam line guide 30 which becomes body transverse line 50. Sinker drop line 24 is positioned on the body release cover plate 54 southeast corner vertex. Compression arm axle pin 32 secures release body cover plate 54 and compression arm 38. Clip arm 40 is disengaged from cam clip catch 42. Clip arm tension screw 44 is located near clip arm 40. The drawing of FIG. 9*b* is an elevation view of the In Line Sliding Release in a locked position. The significant distinction between FIG. 9*b* and FIG. 9*a* is that compression arm 38 has rotated in a counter clockwise direction so that clip arm 40 engages cam clip catch 42.

Figure 10B:
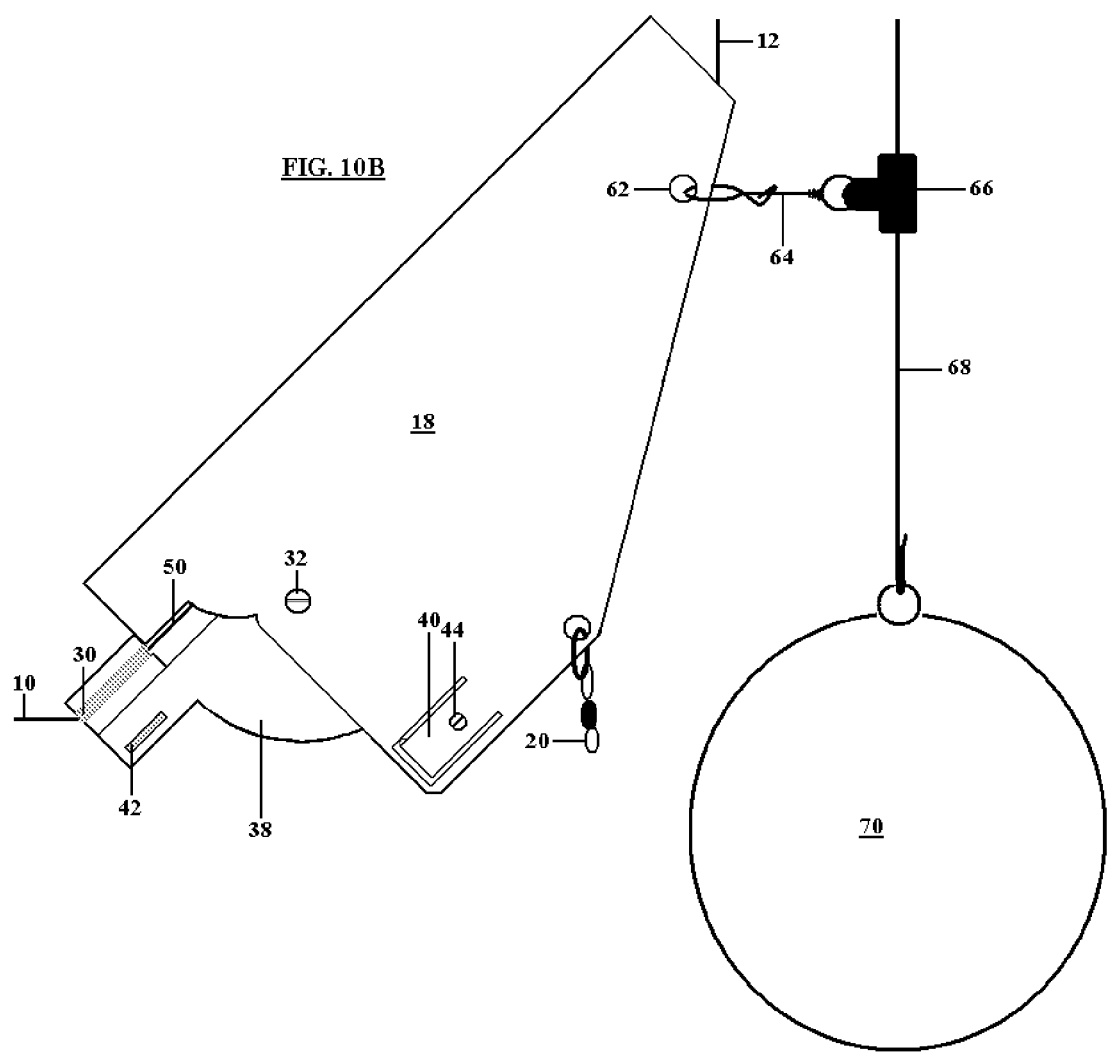
FIG. 10B is a downstream elevation view (lure side) of the In Line Sliding Release in an Unlocked Position attached to a Downrigger.

The drawing of FIG. 10*a* is a downstream elevation view of the In Line Sliding Release in a locked position attached to a downrigger apparatus. The main difference between this drawing and the drawing of FIG. 9*b* is the connection of accessory clip 64 between accessory sinker/downrigger attachment 62 of the In Line Sliding Release 18 and downrigger/secondary release 66 of the downrigger accessory. The drawing of FIG. 10*b* is a downstream elevation view of the In Line Sliding Release in an unlocked position attached to a downrigger apparatus. The main difference between this drawing and the drawing of FIG. 9*a* is the connection of accessory clip 64 between accessory sinker/downrigger attachment 62 of the In Line Sliding Release 18 and downrigger/secondary release 66 of the downrigger apparatus. In each of the drawings of FIG. 10*a* and FIG. 10*b*, the use of and connection of an accessory clip 64 between the sinker/downrigger attachment 62 and downrigger/secondary release 66 enables a downrigger combination usage without the need for line re-rigging when the In-Line Sliding Release tension is set to a lighter setting than the release setting of the downrigger apparatus.

The longitudinal line guide shown in FIG. 4*a* is constructed with a plastic tubular insert. The longitudinal line guide 52 roof and floor are sealed when the two release housing body 48 sides are placed together. The longitudinal line guide 52 channel has been machined to accept a rigid plastic tube that can be welded into place against the two halves of the release housing body 48. The applicant overcame a manufacturing challenge with the use of the tubular insert. An approach known as "sonic" welding prevents the body transverse line 50 shown in FIG. 9*a* and FIG. 9*b* from pinching or jamming under various high pressure fishing situations. The welds are at the extreme corners of the longitudinal line guide 52 located near the physical interface with the release housing body 48 shown in FIGS. 4A and 4B. The longitudinal line guide 52 ensures centering of the body transverse line 50 and avoids jamming of body transverse line 50 between compression arm 38 and release housing body 48. The applicant has found that the line to a fishing rod and reel 12 will easily flow through release housing body 48 and longitudinal line guide 52. It is very important for this device to be able to slide down the line to a fishing rod and reel 12 on release activation.

CONCLUSION, RAMIFICATIONS AND SCOPE

The reader will see that the in-line sliding fishing release of various embodiments may be used to allow a fisher to separate the lure, bait and weight combination at any desired distance while trolling, at anchor or drifting for variations in fishing presentation scenarios. The main features are as follows:

The in-line sliding fishing release slides freely along the fishing line giving the fisher the capability to attach a weight at any point.

When the device is tripped by the strike of a fish or manually by the fisher, it freely slides down the line to the bait/lure combination or to an inline fixed point.

Many types of lure/bait presentations are now possible giving the fisher the ability to use any lure/bait to weight interval combinations.

There are no known issues associated with long fixed leaders in landing a fish.

This device allows any lure/weight interval usage by easy, effective, portable, and economical means.

This device may be adapted for use with a traditional down rigger.

These features allow for a unique fishing presentation experience enabled by an in-line fishing release device without the need for any sort of external apparatus.

Although the descriptions above contain many specifics, these should not be construed as limiting the scope of the embodiment but as merely providing illustrations of some of the presently preferred embodiments and usage scenarios. The device body may be designed in other shapes and with other material compositions. Thus the scope of the embodiment should be determined by the appended claims and their legal equivalents, rather than by the examples given.

I claim:

1. An in-line fishing line release for holding a sinker weight to a fishing line, said fishing line release comprising:

a release housing body attachable to a line to fishing rod via a compression arm fastened by a compression arm axle pin fastener means, with a pivot cam line guide transversely oriented to a longitudinal line guide with said pivot cam line guide capable of holding a leader line;

said release housing body attachable to said line to fishing rod via said compression arm fastened by said compression arm axle pin fastener means with said pivot cam line guide axially oriented to said longitudinal line guide with said pivot cam line guide capable of locking at any point along said leader line;

said longitudinal line guide centers said line to fishing rod where contact is minimized with a brake;

said compression arm axle pin fastener means holding said release housing body in either a locked or unlocked position;

a fishing line tension adjustment control comprising a clip arm tension screw adjustment means and a brake adjustment screw means pair capable of applying tension to a body transverse line applied through said compression arm, with said body transverse line an extension of said leader line; wherein said compression arm is rotatable from said locked position to said unlocked position;

said brake adjustment screw means capable of exerting line tension on said compression arm;

said clip arm tension adjustment screw means capable of adjusting tension on said compression arm through a clip arm and a cam clip catch capable of an immediate release of line tension;

and said release housing body having a sinker connection capable of attaching a sinker weight or a sinker line and weight combination.

2. An in-line fishing line release as described in claim 1, wherein said release housing body contains a generally right angled first vertex, with said release housing body containing a second vertex along the longitudinal axis, with said release housing body containing a third vertex along the transverse axis and said second vertex and said third vertex are connected by a stream-lined hydro-dynamically curved edge capable of having minimal resistance in water.

3. An in-line fishing line release as described in claim 1, wherein said pivot cam line guide is closed along its length with open ends minimizing any possible fishing line breakage upon line tension release triggered when said clip arm catch disengages.

4. An in-line fishing line release as described in claim 1, wherein said longitudinal line guide is closed along its length with an open ended plastic tube insert minimizing any possible fishing line breakage.

5. An in-line fishing line release as described in claim 1, wherein said clip arm tension screw and said brake adjustment screw both apply tension to said body transverse line when said clip arm is engaged in said cam clip catch.

6. An in-line fishing line release as described in claim 1, wherein said clip arm engages said cam clip catch and is capable of accepting a pull exceeding a pre-determined threshold enabling an immediate release of line tension allowing said release housing body to slide along said line to fishing rod.

7. An in-line fishing line release for releasing a sinker weight to a fishing line, said fishing line release comprising:

a release housing body capable of release and sliding along said line to fishing rod via a compression arm fastened by a compression arm axle pin fastener means, with a pivot cam line guide transversely oriented to a longitudinal line guide with said pivot cam line guide capable of holding a leader;

said release housing body capable of locking onto or release from said line to fishing rod via said compression arm by said compression arm axle pin fastener means with said pivot cam line guide axially oriented to said longitudinal line guide with said pivot cam line guide and said release housing body lockable at a pre-determined location along said leader line;

said compression arm axle pin fastener means capable of allowing rotation of said compression arm of said release housing body from a locked position to a release position, allowing said release housing body to slide along said body transverse line;

a fishing line tension adjustment control comprising a clip arm tension screw adjustment means and a brake adjustment screw means pair capable of applying tension to a body transverse line applied through said compression arm, with said body transverse line an extension of said leader line;

said longitudinal line guide centers said line to a fishing rod where contact is minimized with a brake;

said brake adjustment screw means capable of releasing line tension on said compression arm allowing said release housing body to slide along said body transverse line; and said clip arm tension adjustment screw means capable of adjusting tension on said compression arm through a clip arm and a cam clip catch capable of an immediate release of line tension.

8. An in-line fishing line release as described in claim 7, wherein said release housing body contains a generally right angled first vertex, with said release housing body containing a second vertex along the longitudinal axis, with said release housing body containing a third vertex along the transverse axis and said second vertex and said third vertex are connected by a stream-lined hydro-dynamically curved edge capable of having minimal resistance in water.

9. An in-line fishing line release as described in claim 7, wherein said pivot cam line guide is closed along its length with an open ended plastic tube insert minimizing any possible fishing line breakage, maximizing jam free sliding operation.

10. An in-line fishing line release as described in claim 7, wherein said longitudinal cam line guide is closed along its length with an open ended plastic tube insert minimizing any possible fishing line breakage, maximizing jam free sliding operation.

11. An in-line fishing line release as described in claim 7, wherein said body transverse line with said clip arm tension screw means and said brake adjustment screw means adjusts tension to said fishing line when said clip arm is engaged in said cam clip catch.

* * * * *